(12) United States Patent
Alderman

(10) Patent No.: US 6,354,476 B1
(45) Date of Patent: Mar. 12, 2002

(54) SNAP-ON MOTORCYCLE LUGGAGE

(76) Inventor: Leslie K. Alderman, 511 Lakeview Cir., Petaluma, CA (US) 94954

( * ) Notice: Subject to any disclaimer, the term of this patent is extended or adjusted under 35 U.S.C. 154(b) by 0 days.

(21) Appl. No.: 09/640,568

(22) Filed: Aug. 17, 2000

(51) Int. Cl.⁷ .................................................. B62J 7/04
(52) U.S. Cl. ..................... 224/413; 224/427; 224/447; 224/449; 224/450
(58) Field of Search ................. 224/413, 427, 224/447, 448, 449, 450, 428, 432, 435

(56) References Cited

U.S. PATENT DOCUMENTS

| | | | | |
|---|---|---|---|---|
| 4,125,213 A | * | 11/1978 | Watkins | 224/413 |
| 4,195,757 A | * | 4/1980 | Jefferson | 224/413 |
| 4,260,085 A | * | 4/1981 | Jefferson | 224/413 |
| 4,266,703 A | | 5/1981 | Litz | |
| 4,588,114 A | * | 5/1986 | Lebaron et al. | 224/413 |
| 4,629,040 A | * | 12/1986 | Jones | 190/102 |
| 4,809,891 A | | 3/1989 | Patrin | |
| 4,974,765 A | * | 12/1990 | Marchetto et al. | 224/275 |
| 5,190,345 A | * | 3/1993 | Lin | 224/192 |
| 5,245,517 A | * | 9/1993 | Fenton | 224/275 |
| 5,303,795 A | | 4/1994 | Buell | |
| 5,496,089 A | * | 3/1996 | Muderlak | 297/188 |
| 5,573,163 A | * | 11/1996 | Lee et al. | 224/427 |
| 5,577,646 A | * | 11/1996 | White | 224/422 |
| 5,725,138 A | | 3/1998 | Zagrodnik | |
| 5,931,360 A | * | 8/1999 | Reichert | 224/413 |

FOREIGN PATENT DOCUMENTS

JP 274480 * 3/1990

* cited by examiner

Primary Examiner—Stephen P. Garbe
(74) Attorney, Agent, or Firm—Jack Lo

(57) ABSTRACT

The present motorcycle luggage is comprised of a storage container attached on a rigid base plate. The base plate is arranged to be snapped on to a conventional motorcycle body in place of the removable rear seat. Latching members arranged on the bottom of the base plate are arranged to mate with the existing latching receptacles on the motorcycle. Different latching members may be provided for mating with the latching receptacles on different motorcycles. The present luggage is thus quickly installable by a rider without modifying the motorcycle. It is secure from theft. It will never come loose or fall off, and it will never become tangled in the rear wheel like many strapped-on storage devices improvised by riders.

2 Claims, 3 Drawing Sheets

SNAP-ON MOTORCYCLE LUGGAGE

BACKGROUND OF THE INVENTION

1. Field of the Invention

This invention relates generally to luggage for motorcycles.

2. Prior Art

Motorcycles are generally categorized as either touring bikes or sport bikes. Touring bikes are made for leisurely cruising, and are generally provided with storage boxes or luggage bags bolted behind the rider. Sport bikes are made for maneuverability and speed. To minimize weight and preserve their sleek styling, manufacturers do not provide them with any external storage boxes or luggage bags.

In FIG. 1, the upper rear portion of a typical sport bike 10 is shown. It includes a front seat 11, and a removable back seat 12 attached on top of a body 13. Back seat 12 is locked in position with a latching mechanism underneath which is operated with a key lock 14 on the side of body 13. A muffler 15 and a tail light 16 are shown for visual reference. On many different models of sport bikes from different manufacturers, back seat 12 is removable to expose a tiny storage space within body 13. However, within the storage space are exposed mechanical components and many nooks and crannies in which small items can become lost or lodged. It is also too small to hold anything bigger than a paperback novel. Therefore, some riders wear backpacks to carry items too large to fit in the space, but backpacks are uncomfortable, and cannot be left on the bike when the bike is parked in a public place.

Various add-on storage boxes and luggage racks for motorcycles are disclosed in U.S. Pat. No. 5,725,138 to Zagrodnik; U.S. Pat. No. 5,303,795 to Buell; U.S. Pat. No. 4,809,891 to Patrin; and U.S. Pat. No. 4,266,703 to Litz. They are all arranged to be bolted onto the bike by drilling holes or otherwise modifying the bike, and thus require too much work to install. Instead, sport bike riders commonly improvise solutions that typically comprise bags, backpacks, milk crates, or boxes that are tied to the back seat of the bike with elastic cords, ropes, wire, or netting.

An improvised storage device is unattractive and tends to scratch the body work of the bike. A more serious problem is that it can easily come loose. It is thus prone to theft because it can be easily detached. Even if rider is conscientious enough to frequently re-tighten the rigging, it is tiresome to do so. When the rigging comes loose, the storage device can shift position when the bike is in motion and affect the balance of the bike. The rider will tend to adjust it while the bike is still in motion, which is dangerous. It can fall off and hit the vehicles following behind, or even cause them to crash when they swerve to avoid it. Worst, the ropes or cords can come loose and fall onto the rear wheel and drive chain or sprocket directly below the back seat. The rear wheel can lock up and cause the bike to crash. Such accidents are known to have occurred.

OBJECTIVES OF THE INVENTION

Accordingly, the objectives of the present snap-on motorcycle luggage are:

- to provide improved storage space on a motorcycle;
- to be very quickly installable by a rider without modifying the motorcycle;
- to be secure from theft even when the motorcycle is parked in public;
- to never come loose or fall off; and
- to never become tangled in the rear wheel or drive mechanism of the motorcycle.

Further objectives of the present invention will become apparent from a consideration of the drawings and ensuing description.

BRIEF SUMMARY OF THE INVENTION

Many models of conventional motorcycles from different manufacturers are provided with a removable back seat which is secured in position with a latching mechanism operated by a key lock. Accordingly, the present snap-on motorcycle luggage is comprised of a storage container attached on a rigid base plate. The base plate is arranged to be snapped on to a conventional motorcycle body in place of the removable rear seat. Latching members arranged on the bottom of the base plate are arranged to mate with the existing latching receptacles on the motorcycle. Different latching members may be provided for mating with the latching receptacles on different motorcycles. The present luggage is thus quickly installable by a rider without modifying the motorcycle. It is secure from theft. It will never come loose or fall off, and it will never become tangled in the rear wheel like many strapped-on storage devices improvised by riders.

DRAWING REFERENCE NUMERALS

| | |
|---|---|
| 10. Conventional Motorcycle | 11. Front Seat |
| 12. Rear Seat | 13. Body |
| 14. Key Lock | 15. Muffler |
| 16. Tail Light | 20. Luggage |
| 21. Container | 22. Base Plate |
| 23. Latching Members | 24. Tube |
| 25. Loop | 26. Tongue |
| 27. Mounting Plate | 30. Motorcycle |
| 31. Mounting Base | 32. Latching Receptacles |
| 33. Bar | 34. Round Hole |
| 35. First Slot | 36. Second Slot |
| 37. Key Lock | 38. Body |

DETAILED DESCRIPTION OF THE INVENTION

Figure 1:
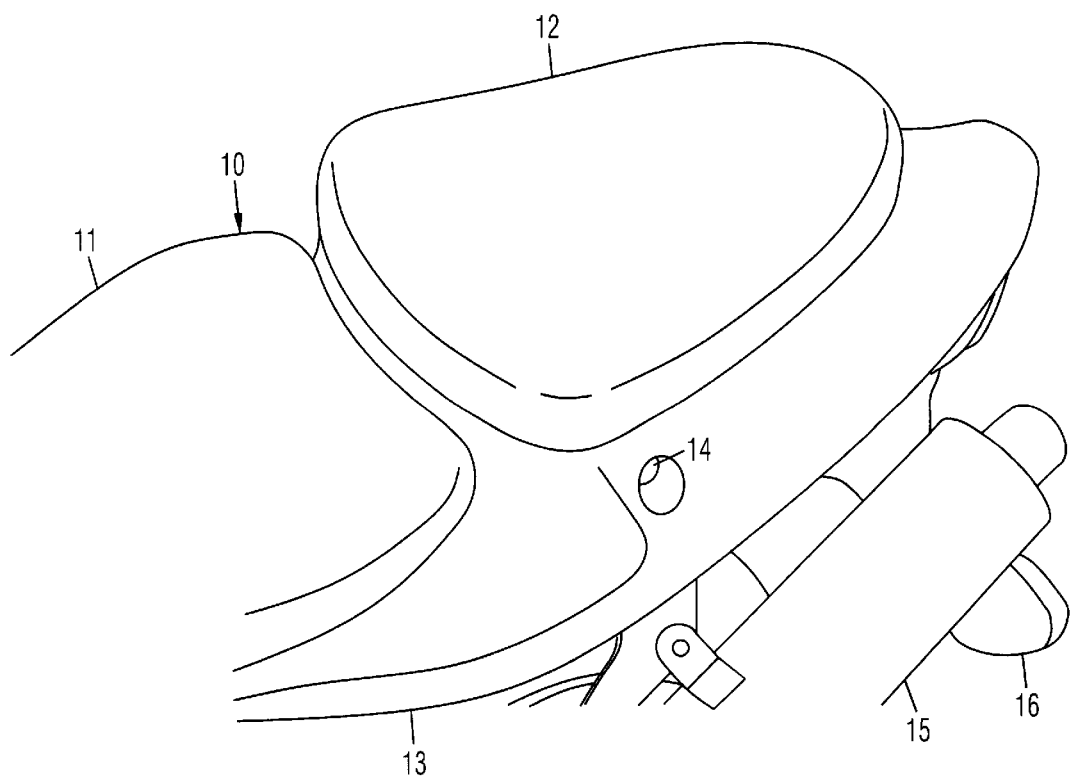
FIG. 1 is a side perspective view of a rear portion of a prior art motorcycle.
Figure 2:
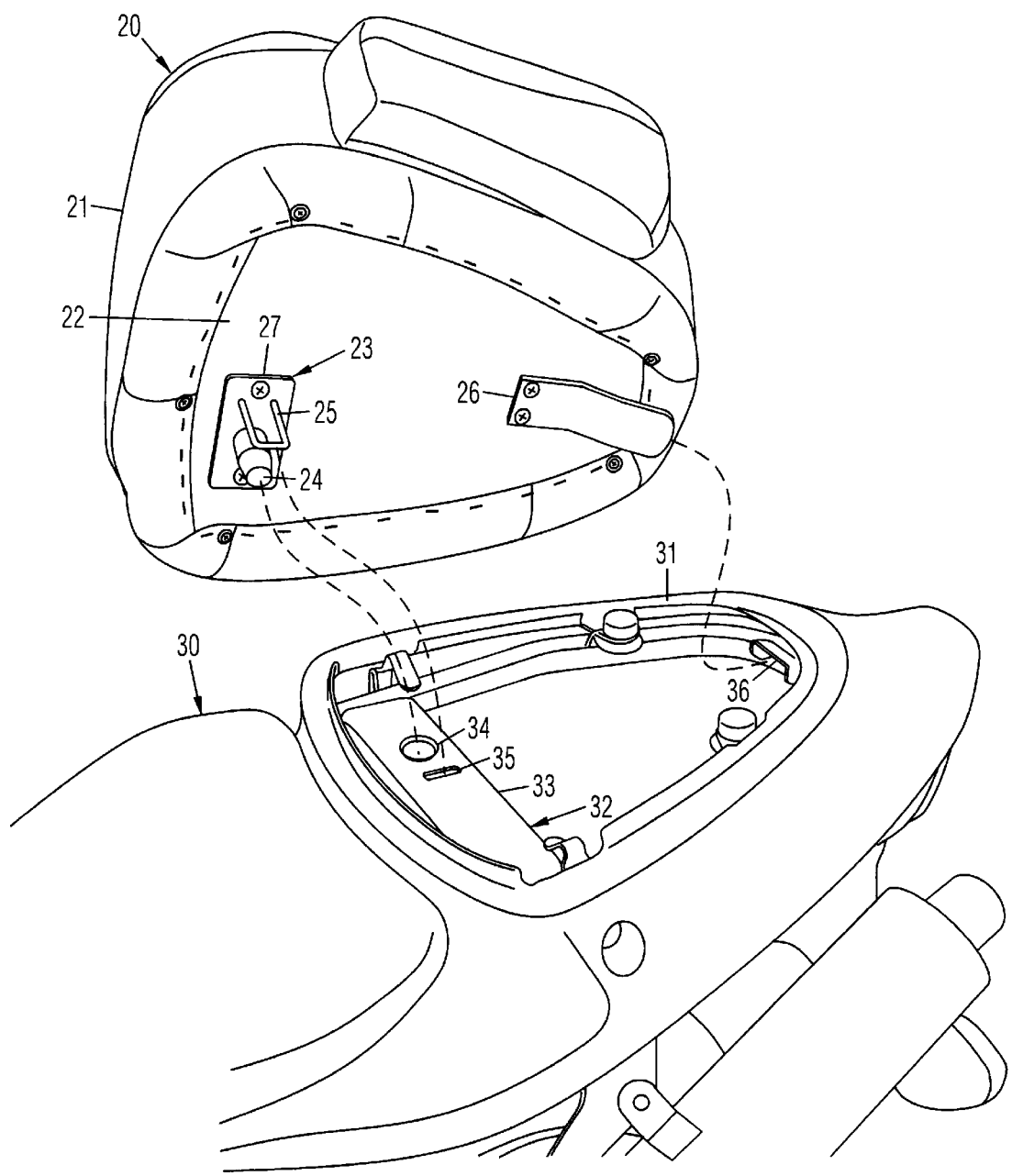
FIG. 2 is a side perspective view of the present snap-on luggage being attached to the motorcycle.

Many models of conventional motorcycles from different manufacturers, particularly sport bikes, are provided with a removable back seat which is secured in position with a latching mechanism operated by a key lock. In FIG. 2, the removable back seat of such a motorcycle 30 has been detached and is not shown, thus exposing a mounting base 31 for the back seat.

A preferred embodiment of the present snap-on motorcycle luggage 20 is shown positioned over motorcycle 30. Luggage 20 is comprised of a storage container 21 attached on top of a rigid base plate 22. Container 21 may be any type of container, such as a soft bag or a rigid case. A soft bag is shown as an example. The soft bag may have any number of zippers and pockets in any arrangement. The sides of the bag may be wrapped around the edges of base plate 22 and fastened to the bottom, such as with staples and screws. If container 21 is a rigid case, base plate 22 is preferably comprised of the bottom closure of the case. Base plate 22 is preferably shaped to generally match the shape of mounting base 31 on motorcycle 30.

Latching members 23 are arranged on the bottom of base plate 22. In this example, latching members 23 are comprised of a tube 24 and a loop 25 attached adjacent the front end of base plate 22, and a tongue 26 attached adjacent the rear end of base plate 22. Tube 24 and loop 25 are preferably attached to a mounting plate 27 which is secured under base plate 22. In this example, the front end of tongue 26 is secured to base plate 22, and the rear end is angled downwardly. Loop 25 may be comprised of any downwardly projecting member with a hole on the side for engaging a locking device in mounting base 31.

Figure 3:
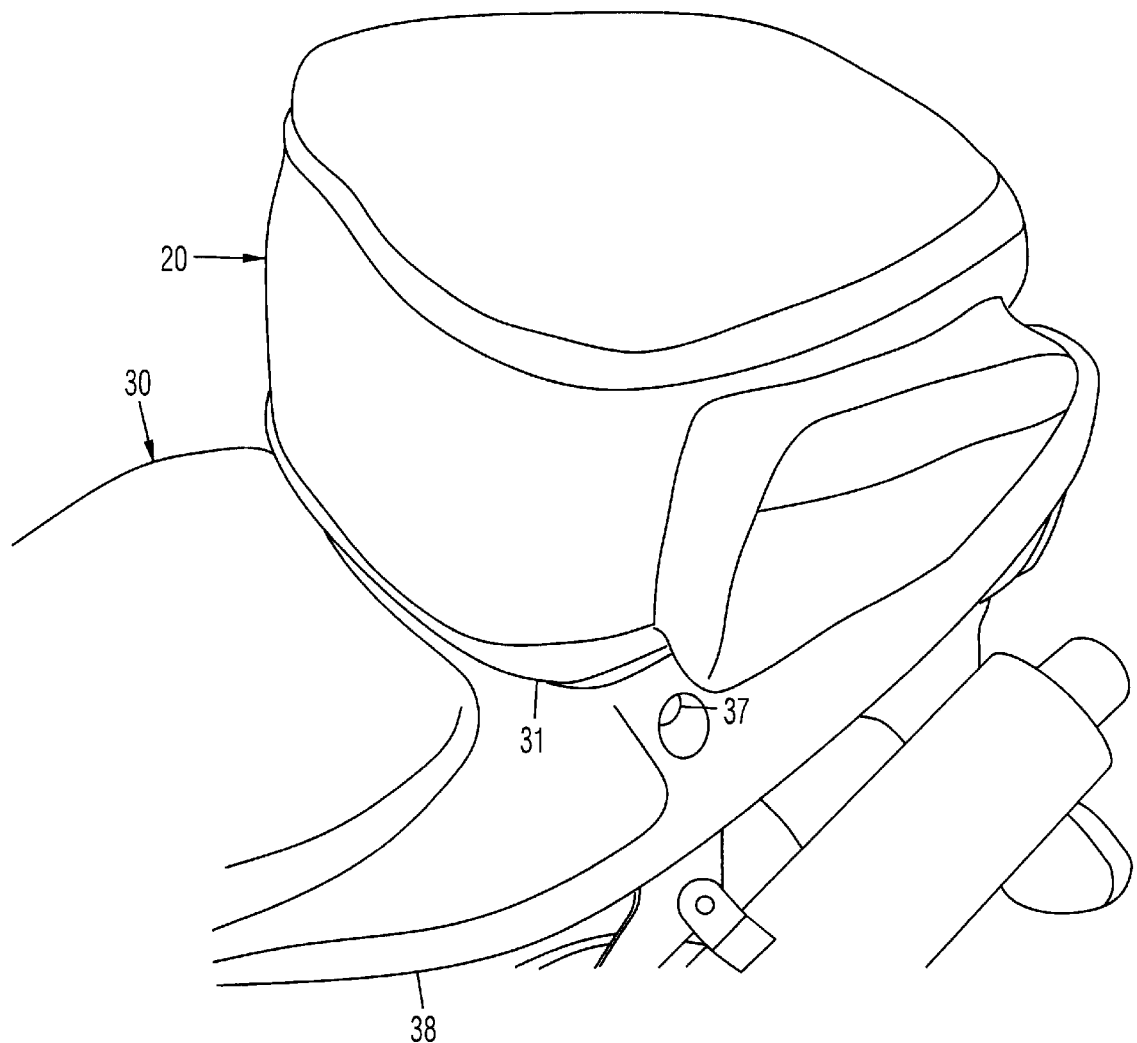
FIG. 3 is a side perspective view of the present snap-on luggage secured on the motorcycle.

Latching members 23 are adapted to mate with preexisting latching receptacles 32 in mounting base 31 of motorcycle 30. In this example, latching receptacles 32 are comprised of a bar 33 with a round hole 34 and a first slot 35 adjacent a front of mounting base 31, and a second slot 36 adjacent a rear of mounting base 31. Luggage 20 is adapted to be snapped onto mounting base 31 by sliding tongue 26 into second slot 36, and pushing down the front of luggage 20 to insert tube 24 into round hole 34, and loop 25 into first slot 35. Luggage 20 is automatically locked in position by mounting base 31 when it is fully seated, as shown in FIG. 3. Luggage 20 can be released only by operating a key lock 37 on the side of a body 38 on motorcycle 30.

Different models of motorcycle have differently shaped rear seats and different types of latching receptacles. Luggage 20 may be made to generally match the shape of the rear seat, and be provided with suitably shaped latching members to mate with the latching receptacles on any particular model of motorcycle with a user-removable back seat. Therefore, a variety of latching members may be provided on different models of the present luggage for fitting different motorcycles. Luggage 20 may also be made to fit other types of motorcycles in addition to sport bikes.

SUMMARY AND SCOPE

Accordingly, the present snap-on motorcycle luggage provides improved storage space on a motorcycle. It is very quickly installable by a motorcycle rider without modifying the motorcycle. It is secure from theft even when the motorcycle is parked in public. It will never come loose or fall off. It will never become tangled in the rear wheel or drive mechanism of the motorcycle. It is thus much more convenient and safer to use than strapped-on storage devices improvised by motorcycle riders.

Although the above description is specific, it should not be considered as a limitation on the scope of the invention, but only as an example of the preferred embodiment. Many variations are possible within the teachings of the invention. For example, different attachment methods, fasteners, materials, dimensions, etc. can be used unless specifically indicated otherwise. The relative positions of the elements can vary, and the shapes of the elements can vary. Therefore, the scope of the invention should be determined by the appended claims and their legal equivalents, not by the examples given.

I claim:

1. A motorcycle luggage for providing storage on a motorcycle with a removable rear seat detachably secured in latching receptacles on a mounting base, comprising:

a rigid base plate for being positioned on said mounting base of said removable rear seat on said motorcycle when said rear seat is removed;

a storage container attached on top of said base plate; and latching members arranged on a bottom of said base plate for mating with said latching receptacles in said mounting base of said rear seat on said motorcycle;

wherein said latching members are comprised of a loop projecting down from adjacent a front of said base plate, and a downwardly angled tongue projecting from adjacent a rear of said base plate.

2. The motorcycle luggage of claim 1, wherein said storage container is comprised of a soft bag attached on top of said base plate, and sides of said soft bag are wrapped around a perimeter of said base plate and secured to said bottom of said base plate.

* * * * *